(12) United States Patent
Tao

(10) Patent No.: US 11,318,964 B2
(45) Date of Patent: May 3, 2022

(54) MOBILE CABIN, RAIL, AND THREE-DIMENSIONAL RAIL TRANSIT SYSTEM

(71) Applicant: NEXTG Technology Inc, Shanghai (CN)

(72) Inventor: Naiqun Tao, Shanghai (CN)

(73) Assignee: NEXTG Technology Inc, Shanghai (CN)

( * ) Notice: Subject to any disclaimer, the term of this patent is extended or adjusted under 35 U.S.C. 154(b) by 273 days.

(21) Appl. No.: 16/562,848

(22) Filed: Sep. 6, 2019

(65) Prior Publication Data

US 2020/0079404 A1     Mar. 12, 2020

(30) Foreign Application Priority Data

Sep. 7, 2018    (CN) .......................... 201811045906.X

(51) Int. Cl.
*B60F 1/00*        (2006.01)
*B61C 3/00*        (2006.01)
(Continued)

(52) U.S. Cl.
CPC ................ *B61C 3/00* (2013.01); *B60F 1/005* (2013.01); *B60F 1/02* (2013.01); *B60L 5/38* (2013.01);
(Continued)

(58) Field of Classification Search
CPC ... B61C 3/00; B61C 3/02; B60L 53/12; B60L 5/38; B60L 2200/26; B60L 53/10; B60L 53/122; B60L 5/39; B60L 5/40; B60L 5/42; B60F 1/00; B60F 1/005; B60F 1/02; B60F 1/04; B60M 1/30; B60M 1/36; B60M 5/00; B61D 1/00; Y02T 90/14; Y02T 10/70; B61B 13/04; B61B 13/00; B61B 15/00
(Continued)

(56) References Cited

U.S. PATENT DOCUMENTS 3,921,532 A * 11/1975 Nelson ................... B62D 1/265
                                               104/130.01
4,090,452 A * 5/1978 Segar ....................... B60M 1/30
                                               104/130.01
(Continued)

FOREIGN PATENT DOCUMENTS

CN       102963228 A * 3/2013
CN       203580529 U * 5/2014

*Primary Examiner* — Zachary L Kuhfuss
*Assistant Examiner* — Cheng Lin
(74) *Attorney, Agent, or Firm* — Novoclaims Patent Services LLC; Mei Lin Wong

(57) ABSTRACT

The invention belongs to the field of vehicles, and particularly relates to a mobile cabin, a rail, and a three-dimensional rail transit system. The mobile cabin includes a mobile cabin chassis, wherein a transparent housing is arranged on the mobile cabin chassis, two or more seats are arranged in a cavity defined by the transparent housing and the mobile cabin chassis, front rubber steering wheels and a rubber driving wheel are arranged on the mobile cabin chassis, the front rubber steering wheels are guide wheels, and the rubber driving wheel is used for driving the whole mobile cabin. The invention has the remarkable effects of improving the traffic capacity and the comfort of personal travel and realizing intelligent traffic.

6 Claims, 7 Drawing Sheets

(51) Int. Cl.
  *B60F 1/02* (2006.01)
  *B60L 5/38* (2006.01)
  *B60L 53/12* (2019.01)
  *B61D 1/00* (2006.01)
  *B60M 1/30* (2006.01)

(52) U.S. Cl.
  CPC .............. *B60L 53/12* (2019.02); *B60M 1/30* (2013.01); *B61D 1/00* (2013.01); *B60L 2200/26* (2013.01); *Y02T 10/70* (2013.01); *Y02T 90/14* (2013.01)

(58) Field of Classification Search
  USPC ....... 104/118, 120, 141, 145, 242, 243, 245, 104/246, 248; 105/49, 50, 51, 215.1, 105/215.2
  See application file for complete search history.

(56) References Cited

U.S. PATENT DOCUMENTS

| | | | | |
|---|---|---|---|---|
| 5,018,453 | A * | 5/1991 | Kinard | B60F 1/00 105/72.2 |
| 5,592,883 | A * | 1/1997 | Andress, III | B60F 1/00 104/88.03 |
| 6,923,124 | B2 * | 8/2005 | Roane | B60F 1/043 104/124 |
| 7,789,020 | B2 * | 9/2010 | Li | B61B 15/00 104/130.01 |
| 9,085,305 | B2 * | 7/2015 | Pumpelly | B61B 15/00 |
| 10,105,999 | B2 * | 10/2018 | McClellan | H02K 7/06 |
| 10,406,922 | B2 * | 9/2019 | Golpe | B60M 1/30 |
| 10,857,889 | B2 * | 12/2020 | Liu | B60L 3/0061 |
| 2019/0375233 | A1 * | 12/2019 | Mooker-Mahadev | B62D 65/12 |

* cited by examiner

MOBILE CABIN, RAIL, AND THREE-DIMENSIONAL RAIL TRANSIT SYSTEM

BACKGROUND OF THE INVENTION

1. Technical Field

This invention belongs to the field of vehicles, and particularly relates to a mobile cabin, a rail, and a three-dimensional rail transit system.

2. Description of Related Art

The acceleration of economic development and urbanization leads to a larger and larger inventory of traditional household cars (using gasoline as the sole form of energy), accompanying traffic congestion, parking difficulty, and environmental pollution. On this background, a novel transit form is needed to realize a breakthrough from traditional household cars.

In recent years, electric cars have developed rapidly and account for a larger and larger proportion of household cars. However, compared to the traditional household cars, the development of the electric cars is only a change to the power source and is not a fundamental breakthrough of the transit form, and the problems of traffic congestion and parking difficulties still remain unsolved; the electric cars also have the shortcomings of poor battery life, environmental pollution caused by a large quantity of scraped batteries, and low power utilization efficiency. Generally speaking, the battery life of the electric cars is about 400 kilometers, and with the manufacturing and usage of more batteries, environmental pollution caused by scrapped batteries will be worse after several years.

In order to meet the travel requirements of a large number of people, the government strongly advocates public transit, wherein rail public transit ranks the top among all public transit means due to its advantages of high speed, being free of traffic jams, large transport capacity, and the like. However, the rail public transit has the shortcomings of long construction periods, large investment, and incapability of meeting individualized requirements.

Several technical solutions have been disclosed in the prior art to solve the above problems. For instance, Chinese Invention Patent Application No. CN200910252592.5 titled "Highway and Railway Convertible Vehicle" discloses a convertible vehicle which can travel on rail buried in a highway road (existing road) by means of steel wheels mounted at the bottom of an existing car and can also leave the rail to travel on the road. However, such vehicle mainly has the following problems: (1) the rail on which the vehicle travels occupies the existing road and is not an independent transit system, which means that the vehicle relies on the existing road and still travels on roads; (2) due to the lack of rail-transfer measures, on-rail overtaking of the vehicle and point-to-point non-stop transport cannot be achieved, and particularly, such vehicle is only suitable for certain highways (it is defined in the claims that the vehicle is only applicable to highways); and (3) the convertible vehicle is driven by two driving systems, namely the car transmits power to the steel wheels to drive the vehicle to travel on the rail, and the car wheels drive the vehicle to travel on the road; and many complex structures have to be configured on the vehicle to achieve switching between the two driving systems.

Chinese Invention Patent Application No. CN201710714014.3 titled "Convertible Transporter" discloses a transporter which is provided with a plurality of rail wheels symmetrically distributed at the bottom of a bearing plate, adopts a hydraulic device to achieve tire switching, and is driven by means of gear engagement. However, this technical solution has the following defects: (1) the application field of the transporter is strictly limited to specific sites, namely intra-field goods transportation; and (2) gear engagement-based driving leads to a low automation degree and failure to realize rapid control.

Chinese Invention Patent Application No. CN201711032770.4 titled "Permanent Magnet Shaft-type Direct-drive Suspension Shared Three-dimensional Rail Transit System" discloses a suspension-type rail and a transit system thereof. This technical solution has the following defects: a driving system is always fixed to the suspension rail and cannot be locked on or unlocked from a vehicle, which means that the vehicle cannot be switched to travel on rails or on roads.

Chinese Invention Patent Application No. CN201710858498.9 titled "Road-Rail Convertible Transit System" discloses a vehicle which travels on a tubular rail having a monorail at the top and an iron rail at the bottom. This technical solution has the following characteristics: (1) a plurality of rails should be configured at the top and bottom respectively; and (2) a set of idle wheels should be configured at the top, and a plurality of rubber wheels and metal wheels should be configured at the bottom. In view of this, this technical solution has the following defects: the vehicle is fixed with two or more rails, so that the structure is too complex technically; and the configuration of the multiple rubber wheels and metal wheels at the bottom of the vehicle leads to an extremely complex structure, a high manufacturing cost, and construction difficulties.

Chinese Invention Patent Application No. CN201610900042.X titled "Variable-wheelbase Highway-railway Convertible Vehicle, Variable-wheelbase Rail Car and Assembly, and Transit System Thereof" discloses a vehicle and a wheelbase changing structure, wherein the wheelbase of the vehicle is the wheelbase of variable rail wheels and can be decreased or increased to adapt to different intra-rail distances, and the wheelbase changing structure is used for changing the wheelbase of each pair of variable rail wheels. This technical solution has the following defects: (1) two rails need to be configured, and the vehicle has to be equipped with a plurality of rubber wheels and metal wheels, so that the manufacturing cost is high; and (2) and the wheelbase has to be changed during rail-transfer of the vehicle, which leads to poor safety of the vehicle.

From the above description, the prior art has the following shortcomings: (1) as the previous generation of main transit means, gasoline vehicles will be replaced by new techniques; (2) the large quantity of private cars have led to severe traffic congestion; (3) new energy vehicles have unconquerable defects in battery life, charging, and other aspects; (4) the urban public rail transit is large in investment and long in construction period and fails to meet individualized requirements; and (5) some technical solutions have the problems of limitations in application fields, incapability to realize rail-road switching, and the complexity of a road-rail switching mechanism based on multiple rubber wheels and metal wheels.

BRIEF SUMMARY OF THE INVENTION

This invention provides a mobile cabin, a rail, and a three-dimensional rail transit system to overcome the shortcomings of the prior art.

The invention is implemented as follows: a mobile cabin comprises a mobile cabin chassis, wherein a transparent housing is arranged on the mobile cabin chassis, two or more seats are arranged in a cavity defined by the transparent housing and the mobile cabin chassis, front rubber steering wheels and a rubber driving wheel are arranged on the mobile cabin chassis, the front rubber steering wheels are guide wheels, and the rubber driving wheel is used for driving the whole mobile cabin.

According to the mobile cabin, mobile cabin dampers used for damping are arranged between the seats and the mobile cabin chassis.

According to the mobile cabin, a distance sensing and rear-view camera is arranged at the tail of the mobile cabin.

According to the mobile cabin, a driving system is composed of the rubber driving wheel driven by a hub motor, perforated disc brakes and brake calipers located on two sides, and an automatic tire pressure adjusting device, wherein a micro electric air pump of a pressure sensor is arranged in the automatic tire pressure adjusting device, and the interior and exterior of a tire communicates through the air pump via a pipeline.

According to the mobile cabin, the mobile cabin chassis further comprises rail guide positioning and supporting devices, rail guide positioning and supporting device locks, rail guide positioning and supporting device lifting support rods, electric hydraulic rail guide positioning device lifting support rods, a guide induction electromagnetic device, a mobile bin battery, and a battery self-balancing counterweight horizontally-moving rail, wherein the number of the rail guide positioning and supporting device lifting support rods is two, and the two rail guide positioning and supporting device lifting support rods are arranged under the mobile cabin chassis and are able to stretch or retreat under control; one rail guide positioning and supporting device is arranged at tail end of each rail guide positioning and supporting device lifting support rod; one rail guide positioning and supporting device lock is arranged at tail end of each rail guide positioning and supporting device, and the two rail guide positioning and supporting device locks are arranged oppositely; a groove shape is formed by the two rail guide positioning and supporting devices and the two rail guide positioning and supporting device locks and is used for accommodating a rail; and two plate-type rail guide positioning devices are arranged under the tail end of the mobile cabin chassis, and rail guide positioning device locks are arranged on opposite sides of the rail guide positioning devices.

According to the mobile cabin, the mobile cabin battery and the battery self-balancing counterweight horizontally-moving rail are arranged in a gap of the mobile cabin chassis, and the mobile cabin battery is arranged on the battery self-balancing counterweight horizontally-moving rail and is able to move along the battery self-balancing counterweight horizontally-moving rail.

According to the mobile cabin, parts of the rail guide positioning and supporting devices and the rail guide positioning and supporting device locks in contact with the rail are vertically positioned, locked, and supported through pulleys and are horizontally positioned through the induction electromagnetic device.

According to the mobile cabin, mobile cabin charging contact slider arms are arranged on the rail guide positioning and supporting device locks, and charging sliders are arranged at the tail ends of the mobile cabin charging contact slider arms.

According to the mobile cabin, the induction electromagnetic device used for horizontal positioning is arranged at the bottom of the mobile cabin, corresponds to the rail in position, and is used for inducing the distance between the mobile cabin and the rail.

According to the mobile cabin, the mobile cabin battery is used as a counterweight for balancing the center of gravity; the mobile cabin is equipped with a balance induction device and the battery self-balancing counterweight horizontally-moving rail; and in the case where the center of gravity deviates when the mobile cabin turns left or right during traveling, the battery moves in a direction opposite to the deviation direction of the center of gravity to keep the center of gravity of the mobile cabin at the center at all times.

The invention further provides a mobile cabin rail. The mobile cabin rail comprises electric wires arranged at positions corresponding to the charging sliders, and the electric wires are fixed to the mobile cabin rail through insulators.

According to the mobile cabin rail, one or more steel stay cables are arranged in the mobile cabin rail.

According to the mobile cabin rail, the steel stay cable comprises an intra-rail steel stay cable ejector rod arranged in the middle of the bottom of the rail, an intra-rail steel stay cable with two ends connected with the bottom of the rail and a middle sustained by the intra-rail steel stay cable ejector rod, and a steel stay cable tension sensing and automatic tensioning device disposed around the intra-rail steel stay cable and used for sensing and tensioning the intra-rail steel stay cable.

According to the mobile cabin rail, a top plane of the mobile cabin rail is as wide as the rubber driving wheel.

According to the mobile cabin rail, the mobile cabin rail comprises a standard straight rail, a curved rail with an angle varying from 0° to 180°, and a rail-transfer device assembly.

According to the mobile cabin rail, the rail-transfer device assembly is a rail with an end fastened on a fixed rail before rail transfer and an end fastened on a rail after rail transfer through a flexible rail, so that rail-transfer positioning and bidirectional movement of a guide groove are realized to drive the rail-transfer flexible rail.

A mobile cabin transit system comprises the mobile cabin according to any one of claims 1-7, wherein the mobile cabin is able to travel on the rail according to claim 8 and is also able to travel on a common road; when the mobile cabin travels on the rail, the mobile cabin battery is charged; and the mobile cabin is driven by the rubber driving wheel to travel.

According to the mobile cabin transit system, the mobile cabin transit system is arranged on existing roads, overhead roads, green belts on two sides of the roads, mountainous areas, jungles, or is implemented by laying the rail in pipelines buried under two sides of the existing roads.

According to the mobile cabin transit system, each mobile cabin has an IP address and is accessed by a background data control center; and when the mobile cabin sends out a travel task, a background system automatically distributes a path for the mobile cabin according to the service state of the rail, and the data system carries out safety control, charge calculation, and charging at the same time.

The invention has the following remarkable effects:

1. Capable of Improving the Traffic Capacity.

The rail is a self-bearing light rail internally provided with steel stay cables and a series of standard components and can be rapidly laid on existing roads or laid over or under road green belts. Through the rail entry, rail departure, and rail transfer techniques, the rail transit systems can meet various requirements and can be connected to form a rail transit network. The rail can be erected to improve the traffic capacity without occupying land and existing roads. The mobile cabin can travel on rails and on common roads and is integrated with an existing transit system, and the public rail for private travel continues one part of the urban transit system.

In the initial stage when there are only several main lines (rails) in a city, rail charging is achieved, and the battery life of the mobile cabin on roads is improved, which lays a foundation for the application and popularization of the mobile cabin. When the main lines (rails) are connected, an independent integrated novel transit network is formed.

2. Capable of Improving the Comfort Degree of Personal Travel and Realizing Intelligent Traffic.

Different from all existing rail transit systems which require a rail system for private travel in addition to the existing public rail transit, the mobile cabin mainly travels on rails with the rail construction from main lines to branch lines, so that point-to-point non-stop travel at the first class is achieved in the whole process.

Reference Signs: 1, front rubber steering wheel; 2, rail guide positioning and supporting device; 3, rail guide positioning and supporting device lock; 4, rail guide positioning and supporting device lifting support rod; 5, electric hydraulic rail guide positioning device lifting support rod; 6, mobile cabin battery; 7, front seat; 8, mobile cabin chassis; 9, mobile cabin damper; 10, rail guide positioning device; 11, rail guide positioning device lock; 12, rubber driving wheel; 13, hub motor; 14, transparent housing; 15, distance sensing and rear-view camera; 16, back seat; 17, rail; 18, fixed rail before rail transfer; 19, rail-transfer flexible rail; 20, fixed rail after rail transfer A; 21, fixed rail after rail transfer B; 22, rail-transfer device assembly; 23, rail-transfer positioning and guiding groove of flexible rail; 24, electric wire; 25, mobile cabin charging contact slider arm; 26 insulator; 27, charging slider; 28, guide induction electromagnetic device; 29, rail bearing steel stay cable device; 30, battery self-balancing counterweight horizontally-moving rail; 31, perforated disc brake; 32, automatic tire pressure adjusting device; 33, brake caliper; 34, intra-rail steel stay cable; 35, intra-rail steel stay cable ejector rod; 36, steel stay cable tension sensing and automatic tensioning device.

DETAILED DESCRIPTION OF THE INVENTION

As shown in the figures, a mobile cabin comprises a cabin body, a rail, a power system, a rail transfer system, and the like, and mainly consists of the following four technical constituent parts.

1. Mobile Cabin

Figure 1:
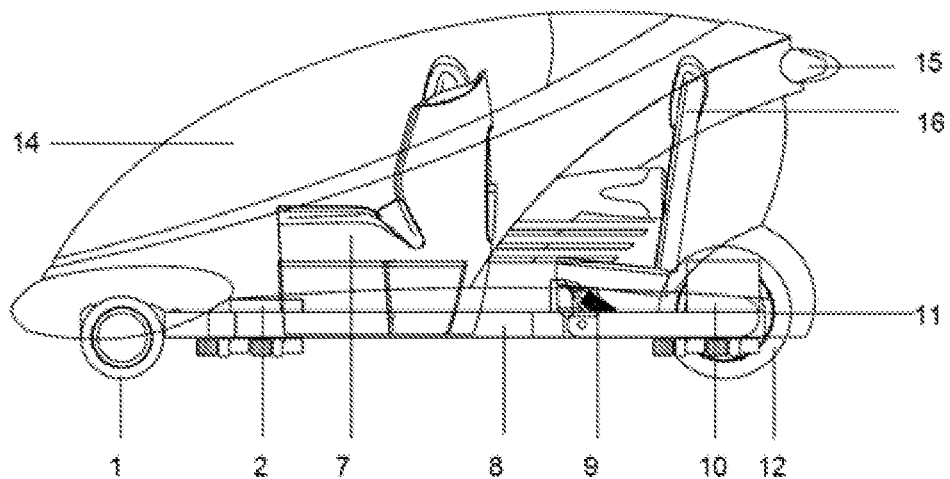
FIG. 1 is an overall structural view of a mobile cabin of this application.
Figure 2:
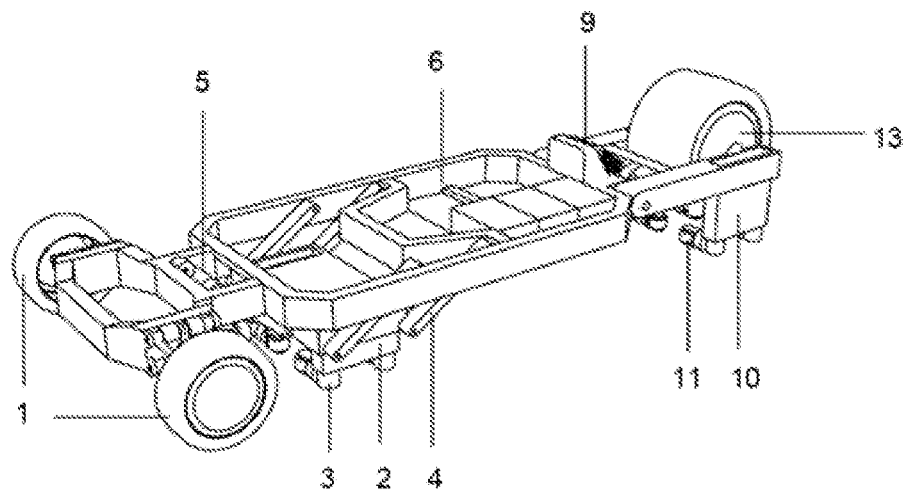
FIG. 2 is a structural view of a mobile cabin chassis.

1) As shown in FIG. 1 and FIG. 2, the mobile cabin is a transit carrier and consists of:

front rubber steering wheels, rail guide positioning and supporting devices, rail guide positioning and supporting device locks, rail guide positioning and supporting device lifting support rods, a mobile cabin battery, electric hydraulic rail guide positioning device lifting support rods, a seat, a mobile cabin chassis, mobile chain dampers, rail guide positioning devices, a rubber driving wheel (driven by a hub motor), a hub motor, a warning light, a seat (back), and a transparent housing.

The mobile cabin is able to carry two passengers, thereby meeting private traveling requirements.

Figure 3:
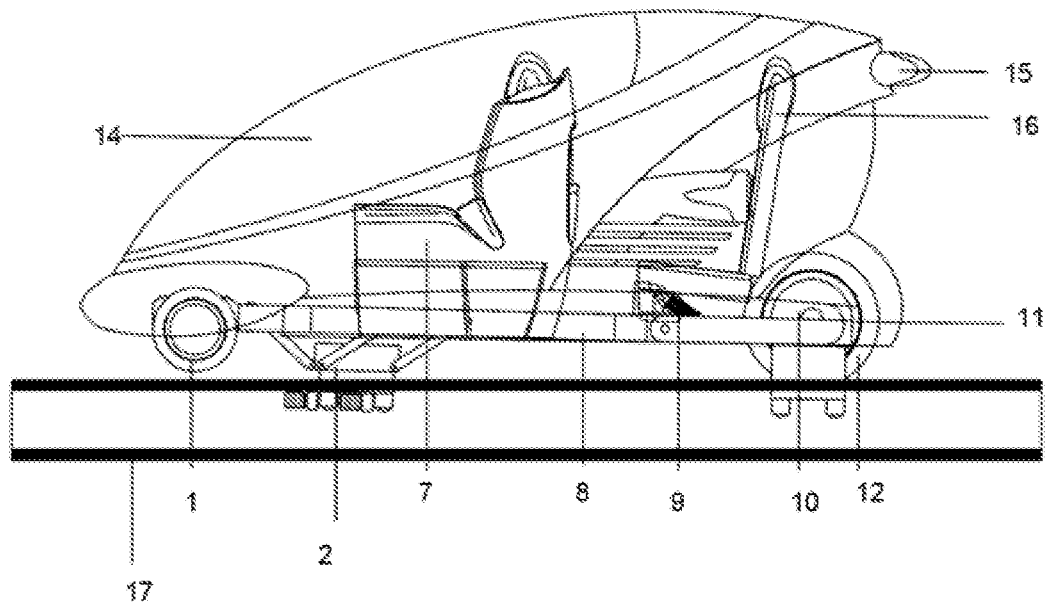
FIG. 3 is a schematic diagram of the mobile cabin traveling on a rail.
Figure 5:
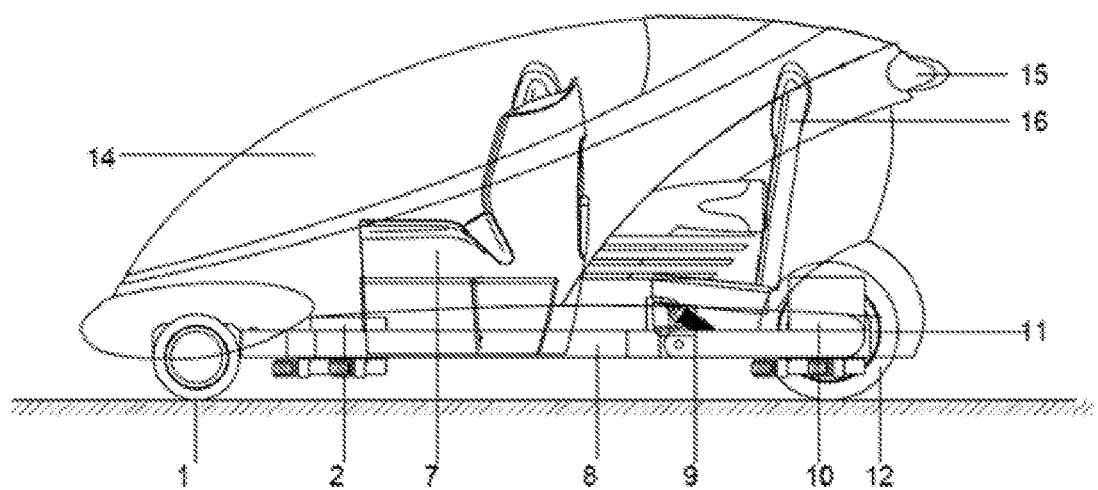
FIG. 5 is a schematic diagram of the mobile cabin traveling on a road.

2) The mobile cabin generally travels on a matching rail as shown in FIG. 3 and can also travel on a road in a railless area as shown in FIG. 5

Figure 14:
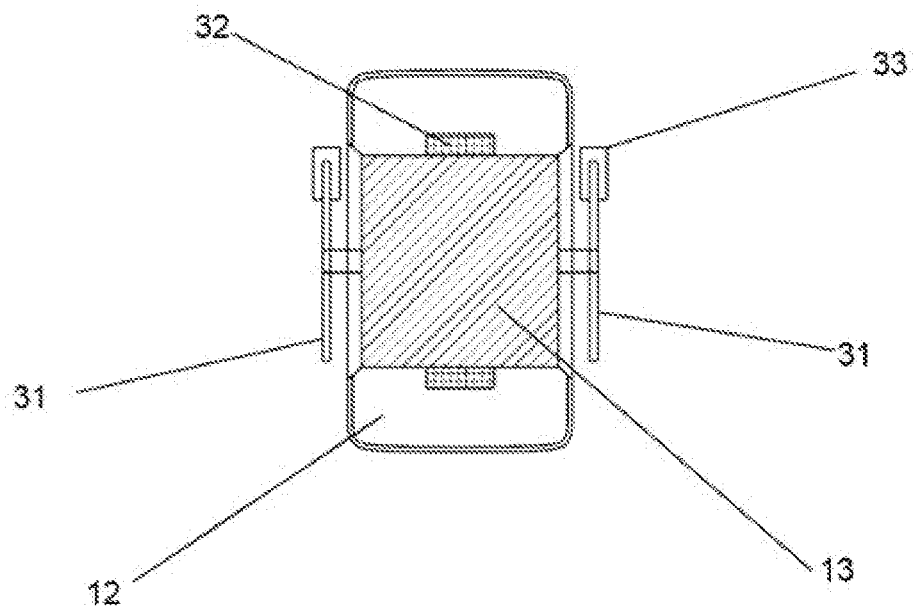
FIG. 14 is a sectional view of a driving wheel.
Figure 15:
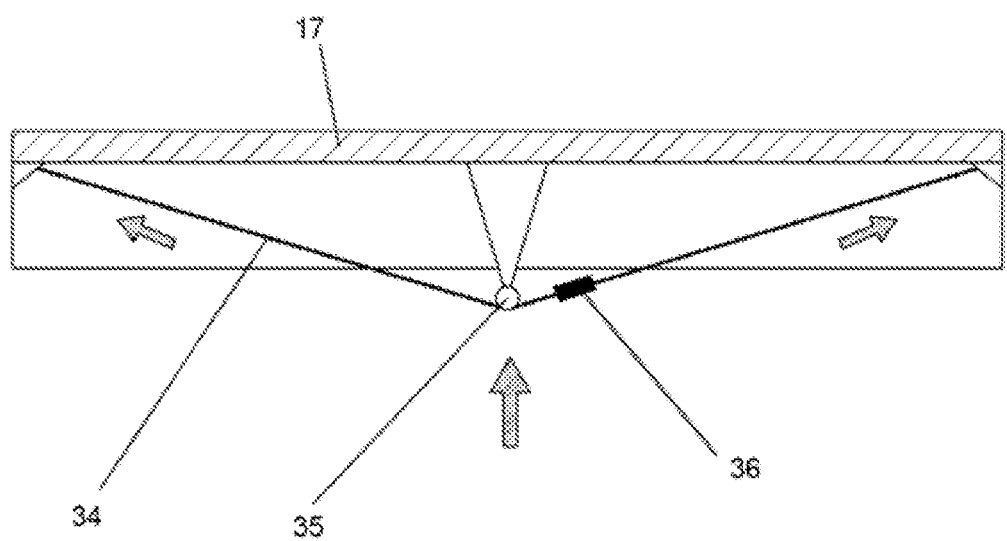
FIG. 15 is a schematic diagram of a self-bearing inner steel stay cable rail.

3) The mobile cabin is provided with only one driving system which is composed of the rubber driving wheel driven by the hub motor, perforated disc brakes and brake calipers located on two sides, and an automatic tire pressure adjusting device; the mobile cabin is driven by the driving wheel when traveling on the rail as well as traveling on a common road, so that tire switching is not needed; and the air pressure in the tire can be automatically adjusted in the driving process according to the road conditions, and particularly, the air pressure is decreased when the mobile cabin travels on the common road to meet the comfort requirements on the road, and the air pressure is increased when the mobile cabin travels on the rail to meet the requirements for energy saving and high efficiency, as shown in FIG. 14.

4) Traveling of the Mobile Cabin on the Road: as shown in FIG. 5, when the mobile cabin travels on the road, the front rubber steering wheels descend to the ground, the rail guide positioning and supporting devices and the rail guide positioning devices ascend, a steering wheel of a vehicle is lifted by the front rubber steering wheels and the rubber driving wheel (driven by the hub motor), and the mobile cabin is driven by the rubber driving wheel (driven by the motor) to travel.

Figure 4:
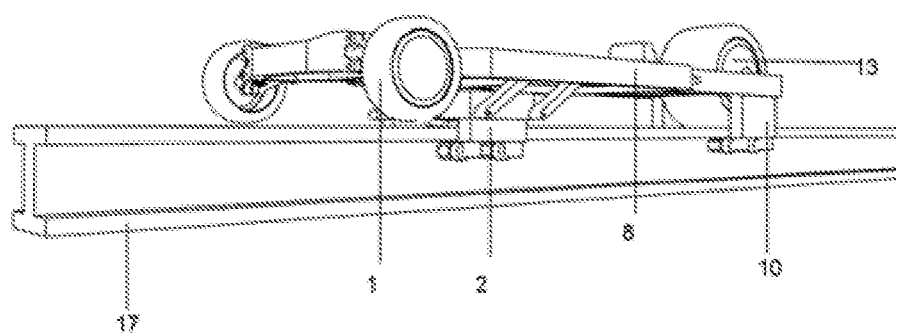
FIG. 4 is a state diagram of the chassis when the mobile cabin travels on the rail.

5) Traveling of the Mobile Cabin on the Rail: as shown in FIG. 3 and FIG. 4, when the mobile cabin travels on the rail, the rail guide positioning and supporting devices are pushed by the electric hydraulic rail guide positioning device lifting support rods to descend, the front rubber steering wheels on the ground are lifted by the electric hydraulic rail guide positioning device lifting support rods to suspend, the rail guide positioning devices descend to be positioned on the rail. At this moment, the whole mobile cabin is supported by the rail guide positioning and supporting devices and the rubber driving wheel (driven by the hub motor), and the mobile cabin is driven by the rubber driving wheel (driven by the hub motor) to travel along the rail.

6) The mobile cabin is driven by one driving system and one rubber driving wheel (driven by the hub motor) when traveling on the road and on the rail, and the hub motor used for driving the rear wheel is located in the middle of the rear portion of the mobile cabin. The mobile cabin is driven by three wheels when traveling on the road and is driven by the rear wheel when traveling on the rail, so that the structure of the mobile cabin is made simple and reliable, the manufacturing cost is low, and switching of the driving wheel is not needed no matter whether the mobile cabin travels on the track or on the road.

Figure 6:
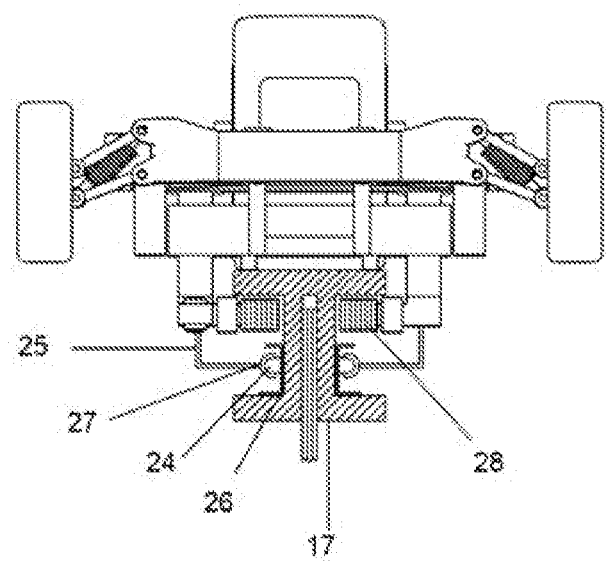
FIG. 6 is a charging diagram of the mobile cabin on the rail.

7) Power Source of the Mobile Cabin: as shown in FIG. 6, when the mobile cabin travels on the rail, power is mainly supplied by the rail to drive the mobile cabin to travel and to charge the mobile cabin battery in the mobile cabin at the same time; when the mobile cabin travels on the road, power is supplied to the mobile cabin by the mobile cabin battery. Due to the fact that the mobile cabin travels on the railless road for only last several kilometers or tens of kilometers (with the construction of the rail, the mobile cabin battery just needs to meet the traveling requirements on the road for final several kilometers), the requirement for the battery life is greatly lowered. The battery life of this mobile cabin is able to meet the traveling requirements on rail-less roads in cities.

2. Rail, Rail Transfer, and Rail Power Supply

Figure 7:
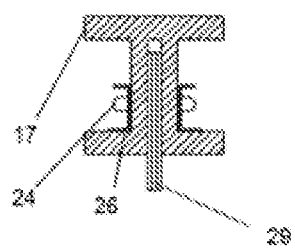
FIG. 7 is a schematic diagram of a mobile cabin rail.

As shown in FIG. 7, a light composite monorail matched with the mobile cabin has the following characteristics:

1) The rail is designed to allow the mobile cabin to be driven by the rubber driving wheel (driven by the hub motor) to travel thereon, and thus, the top plane of the rail should be as wide as the rubber driving wheel (driven by the hub motor); in order to guarantee the traveling safety and stability of the mobile cabin on the monorail, the rail should meet the positioning requirements of the rail guide positioning and supporting devices and the rail guide positioning devices of the mobile cabin.

2) The rail is able to bear the weight of the mobile cabin under a large-span condition, thereby being independent of existing roads.

3) Rail Power Supply

As shown in FIG. 6, the rail includes an auxiliary power supply circuit, and insulators and electric wires are integrated on the rail. When the mobile cabin travels on the rail, the rail power supply circuit supplies power to drive the mobile cabin to travel and to charge the mobile cabin battery.

When the mobile cabin settles on the rail, electric energy on the electric rail is input to the mobile cabin by means of mobile cabin charging contact slider arms at the bottom of the mobile cabin. The electric wires of the rail are connected to a power grid and are divided into a plurality of sections. The mobile cabin charging contact slider arms retreat automatically when the mobile cabin departs from the rail or when the rail is transferred.

4) Rail Transfer

Figure 9:
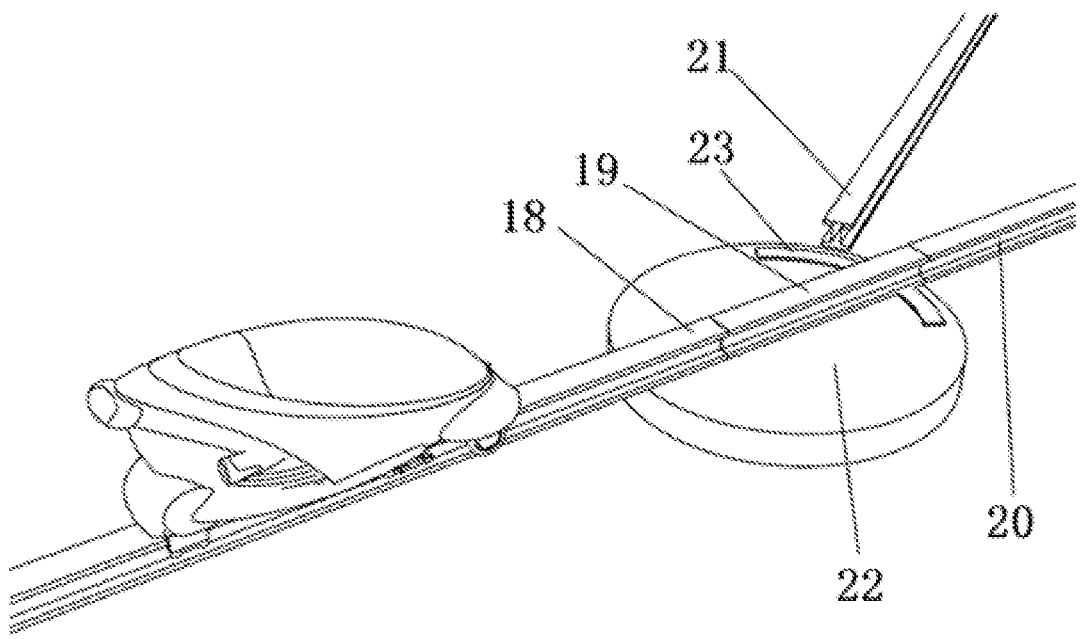
FIG. 9 is a schematic diagram of the rail before rail transfer.
Figure 10:
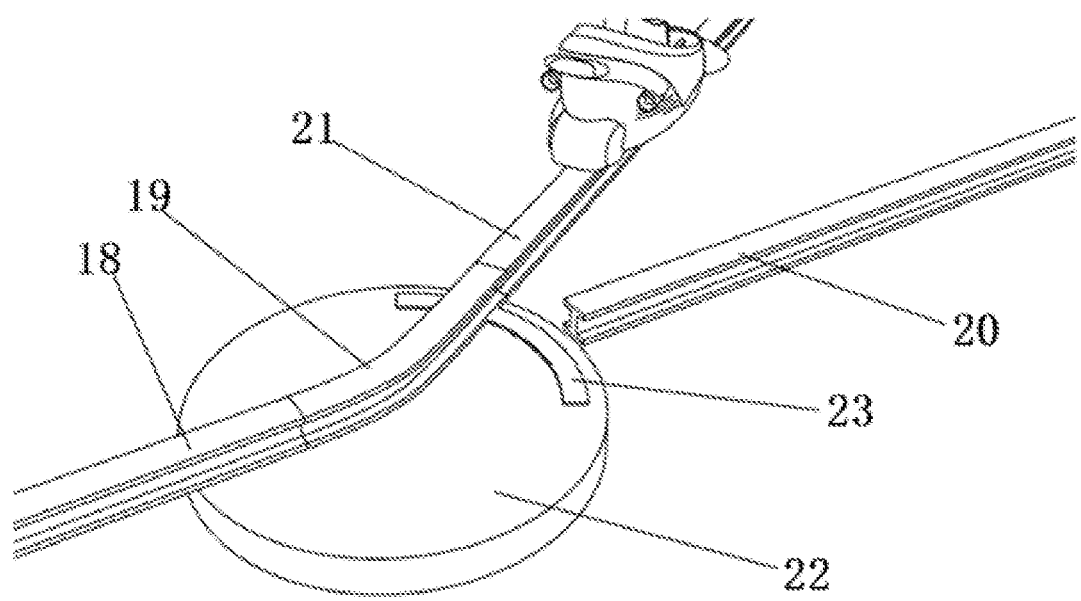
FIG. 10 is a schematic diagram of the rail after rail transfer.
Figure 11:
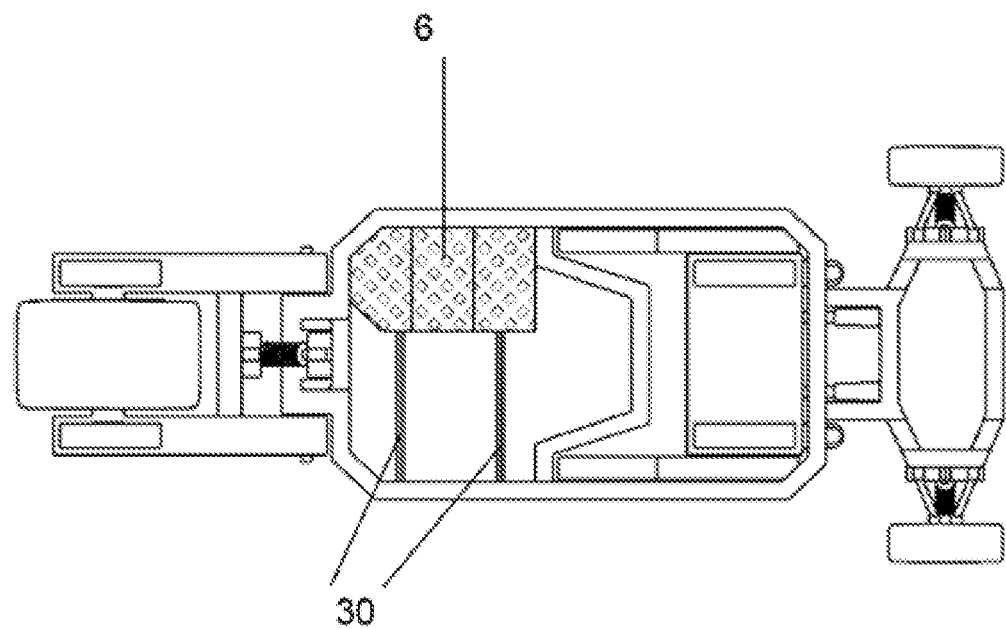
FIG. 11 is a schematic diagram of a battery balance weight.
Figure 12:
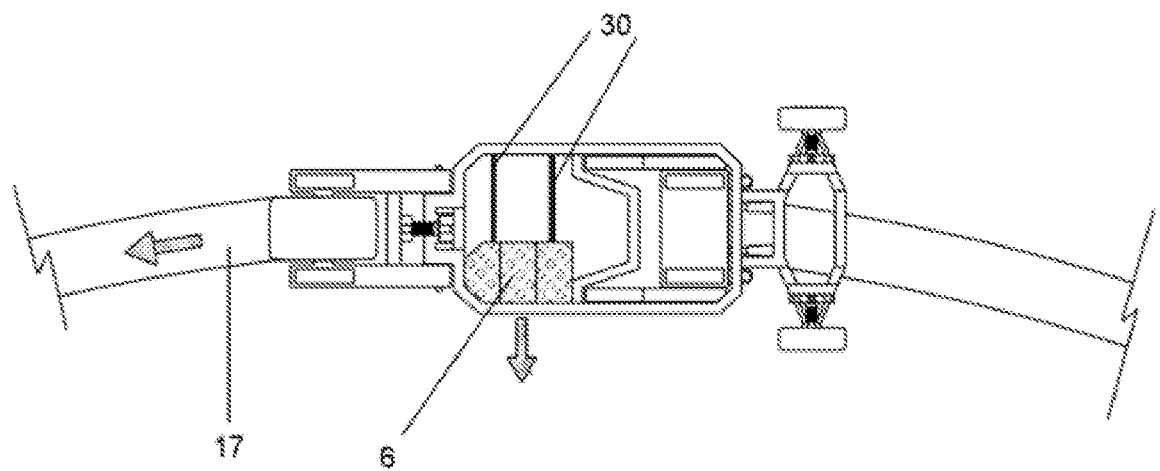
FIG. 12 is a positional diagram of the battery balance weight when the mobile cabin turns left during traveling.
Figure 13:
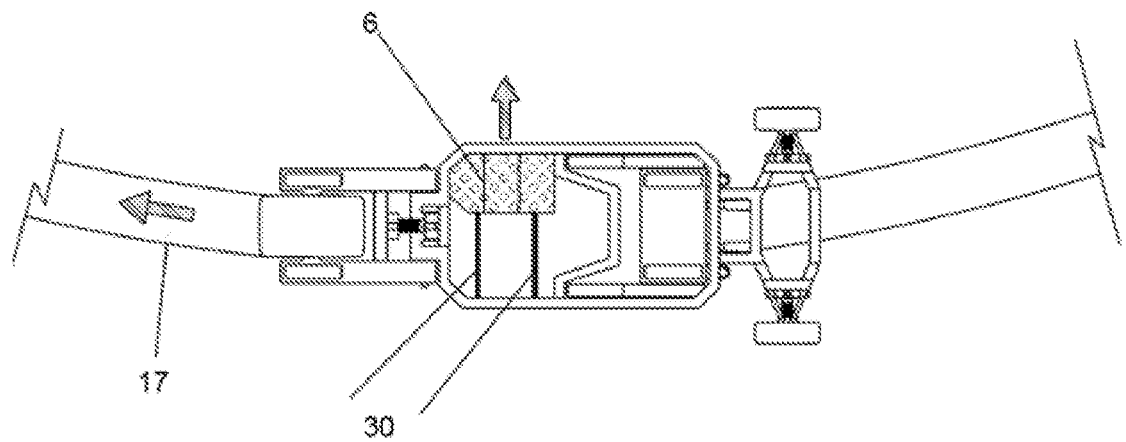
FIG. 13 is a positional diagram of the battery balance weight when the mobile cabin turns right during traveling.

As shown in FIG. 9 and FIG. 10, the rail-transfer device assembly is an important constituent part of the rail and enables the mobile cabin to rapidly drive left or right to enter or depart from the rail rapidly.

5) The Rail is Standard, Easy to Install and Low in Cost

The rail includes a straight rail, a curved rail at a variable angle, a steering module, rail brackets, rail support columns, and the rail-transfer device assembly. All the components are produced by a standard and are combined in different ways to meet the requirements of the rail on different occasions, and standard production greatly reduces the costs.

6) Erection of the Rail

The rail is erected on existing roads, overhead roads, green belts on two sides of the roads, mountainous areas, jungles, or is laid through pipelines buried under two sides of the existing roads. The mobile cabin has a low weight of only hundreds of kilograms, and thus has low requirements for the rail. Complex infrastructure construction is not needed. The rail can be laid in green belts or overhead roads without occupying urban spaces.

3. A Novel Transit System Formed by the Mobile Cabin and the Rail Includes Entry to Overhead Roads or Underground Rails, Rail Transfer, and Departure from Rails.

1) Entry to Overhead Roads or Underground Rails

Figure 8:
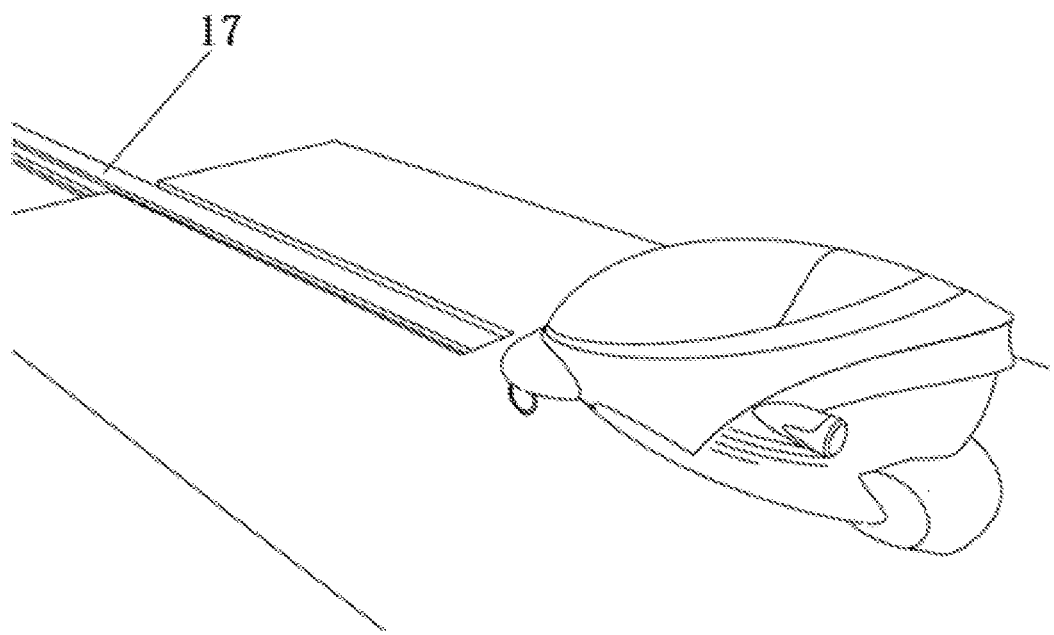
FIG. 8 is a state diagram of the mobile cabin entering the rail.

As shown in FIG. 8, when the mobile cabin is about to travel on the rail, the mobile cabin queues up to enter a specific entry area, at this moment, the mobile cabin sends out an entry instruction and is then automatically controlled by an induction and control system in the entry area to drive onto the rail, and the rail is positioned and locked, so that the mobile cabin enters into the rail traveling mode. Because the rail is a monorail, the rail should be positioned and supported by the rail guide positioning and supporting devices and the rail guide positioning devices in the mobile cabin so as to ensure the operating stability and traveling safety of the mobile cabin. The mobile cabin is driven by the rubber driving wheel (driven by the hub motor) to travel in the rail traveling mode.

2) Rail Transfer

The rail-transfer device assembly is installed in a rail-transfer area, wherein the rail-transfer device assembly is provided with a rail-transfer flexible rail and has an end fastened on a fixed rail before rail-transfer and an end driving the rail-transfer flexible rail to realize rapid rail transfer by means of bidirectional movement of rail-transfer positioning and guiding grooves of the flexible rail, so that leftward and rightward rail-transfer requirements are met. The mobile cabin sends out a rail-transfer instruction to realize automatic rail transfer.

3) Traveling on Existing Roads

The rail is constructed on the basis of an existing road system, and the rail transit system is integrated into the existing road system, and thus, the mobile cabin is able to travel on the existing roads.

When the mobile cabin is to travel on a road, the mobile cabin drives to a rail exit first, the control system automatically switches the mobile cabin into a road traveling state from a guide supporting state, automatic traveling control is ended when the mobile cabin automatically drives to a specific area on the road, and the steering wheel automatically ascends to achieve manual driving. At this moment, the rail guide positioning and supporting devices are retreated by the electric hydraulic guide positioning device lifting support rods, the mobile cabin charging contact slider arms are retreated at the same time, and the front rubber steering wheels descend, so that the mobile cabin enters into a road manual driving mode.

4. Data and Control

The whole transit system includes a data and control system.

Each mobile cabin has an IP address and is accessed by a background data control center. When the mobile cabin sends out a travel task, a background system automatically distributes a path for the mobile cabin according to the service state of the rail. The data system carried out safety control, charge calculation, and charging at the same time.

What is claimed is:

1. A mobile cabin, comprising a mobile chassis (8), a transparent housing (14) arranged on the mobile cabin chassis (8), two or more seats are arranged in a cavity defined by the transparent housing (14) and the mobile cabin chassis (8), front rubber steering wheels (1) serving as guide wheels and a rubber driving wheel (12) arranged on the mobile cabin chassis (8) and used for driving the whole mobile cabin, wherein the mobile cabin chassis (8) further comprises rail guide positioning and supporting devices (2), rail guide positioning and supporting device locks (3), rail guide positioning and supporting device lifting support rods (4), electric hydraulic rail guide positioning device lifting support rods (5), a guide induction electromagnetic device (28), a mobile bin battery (6), and a battery self-balancing counterweight horizontally-moving rail (30); the number of the rail guide positioning and supporting device lifting support rods (4) is two, and the two rail guide positioning and supporting device lifting support rods (4) are arranged under the mobile cabin chassis (8) and are able to stretch or retreat under control; one said rail guide positioning and supporting device (2) is arranged at a tail end of each said rail guide positioning and supporting device lifting support rod (4); one said rail guide positioning and supporting device lock (3) is arranged at a tail end of each said rail guide positioning and supporting device (2), and the two rail guide positioning and supporting device locks (3) are arranged oppositely; a groove shape is formed by the two rail guide positioning and supporting devices (2) and the two rail guide positioning and supporting device locks (3) and is used for accommodating a rail; and two plate-type rail guide positioning devices (10) are arranged under a tail end of the mobile cabin chassis (8), and rail guide positioning device locks (11) are arranged on opposite sides of the rail guide positioning devices (10).

2. The mobile cabin according to claim 1, wherein the mobile cabin battery (6) and the battery self-balancing counterweight horizontally-moving rail (30) are arranged in a gap of the mobile cabin chassis (8), and the mobile cabin battery (6) is arranged on the battery self-balancing counterweight horizontally-moving rail (30) and is able to move along the battery self-balancing counterweight horizontally-moving rail (30) in a horizontal direction.

3. The mobile cabin according to claim 2, wherein the mobile cabin battery is used as a counterweight for balancing a center of gravity of the mobile cabin in the horizontal direction and is arranged to move in a horizontal direction in a response to a balance sensing device of the mobile cabin; when the mobile cabin moves in a deviation direction during traveling, the mobile cabin battery moves in a direction opposite to the deviation direction along the battery horizontally-moving rail (30) to keep the center of gravity of the mobile cabin at the center at all times along the horizontal direction.

4. The mobile cabin according to claim 1, wherein parts of the rail guide positioning and supporting devices (2) and the rail guide positioning and supporting device locks (3) in contact with the rail are vertically positioned, locked, and supported through pulleys and are horizontally positioned through the induction electromagnetic device.

5. The mobile cabin according to claim 1, wherein mobile cabin charging contact slider arms (25) are arranged on the rail guide positioning and supporting device locks (3), and charging sliders (27) are arranged at a tail ends of the mobile cabin charging contact slider arms (25).

6. The mobile cabin according to claim 1, wherein the induction electromagnetic device (28) used for horizontal positioning is arranged at a bottom of the mobile cabin, corresponds to the rail in position, and is used for inducing a distance between the mobile cabin and the rail.

* * * * *